United States Patent [19]

Matlack

[11] Patent Number: 4,703,098
[45] Date of Patent: Oct. 27, 1987

[54] METATHESIS POLYMERIZATION OF THERMALLY OLIGOMERIZED DICYCLOPENTADIENE

[75] Inventor: Albert S. Matlack, Hockessin, Del.

[73] Assignee: Hercules Incorporated, Wilmington, Del.

[21] Appl. No.: 19,465

[22] Filed: Feb. 26, 1987

[51] Int. Cl.4 .......................................... C08F 232/08
[52] U.S. Cl. .................................................... 526/283
[58] Field of Search ........................................ 526/283

[56] References Cited

U.S. PATENT DOCUMENTS 4,400,340  8/1983  Klosiewicz ........................ 526/283
4,558,107 12/1985  Evans ................................. 526/283

Primary Examiner—Paul R. Michl
Attorney, Agent, or Firm—William S. Alexander

[57] ABSTRACT

This invention teaches the preparation of crosslinked copolymers of dicyclopentadiene and higher oligomers of cyclopentadiene. Such copolymers are characterized by having significantly higher heat distortion temperatures and glass transition temperatures than crosslinked dicyclopentadiene homopolymer.

3 Claims, No Drawings

METATHESIS POLYMERIZATION OF THERMALLY OLIGOMERIZED DICYCLOPENTADIENE

This invention relates to copolymers of dicyclopentadiene and higher cyclopentadiene oligomers.

Over the last several years, a number of patents have issued covering poly(dicyclopentadiene) and various aspects of the manufacture thereof, including copolymerization with other metathesis-polymerizable cyclic olefins. The polymers and copolymers are crosslinked materials prepared by metathesis polymerization of dicyclopentadiene and other norbornene-type compounds in a mold to form shaped articles directly upon solidification.

The thermoset homopolymer of dicyclopentadiene is characterized by its unique balance of modulus with impact strength, two parameters which are usually mutually incompatible. That is to say, good modulus and the molecular rigidity that goes with it usually result in a polymer having poor impact strength. This is not the case with poly(dicyclopentadiene).

A drawback of poly(dicyclopentadiene) for many applications is that it has a relatively low heat distortion temperature and glass transition temperature (Tg), i.e., Tg about 120° C. It has been proposed to overcome this shortcoming by copolymerizing dicyclopentadiene with other materials. Materials that have been proposed and demonstrated for this purpose include, e.g., dimethanooctahydronaphthalene, dimethanohexahydronaphthalene, and certain polar comonomers having multiple points of unsaturation. Such copolymers, incorporating, as they do, uncommon comonomers, are necessarily much more expensive than a polymer based on dicyclopentadiene alone since the comonomers must be custom synthesized.

It is the objective of this invention to provide copolymers of dicyclopentadiene which exhibit significantly improved Tg and heat distortion temperature over that known to the art heretofore and which do not depend upon use of expensive, custom synthesized monomers.

In accordance with this invention, it has been found that crosslinked copolymers of dicyclopentadiene with higher cyclopentadiene oligomers have glass transition and heat distortion temperatures significantly higher than does dicyclopentadiene homopolymer. The copolymers according to this invention are comprised of about 40 to 95% by weight of dicyclopentadiene repeating units and about 60 to 5% by weight of repeating units derived from higher cyclopentadiene oligomers. Preferred copolymers are those having 40 to 85% dicyclopentadiene and 15 to 60% oligomer, and most preferred are those having 40 to 80% dicyclopentadiene and 20 to 60% oligomer. The higher cyclopentadiene oligomer is usually a mixture of oligomers, i.e., trimer, tetramer and pentamer of cyclopentadiene.

The copolymers according to this invention are prepared via substantially the same techniques as have been taught for the preparation of dicyclopentadiene homopolymers. Thus, the reaction is carried out under the influence of a tungsten or molybdenum compound, activated via an alkyl aluminum compound. The preferred tungsten or molybdenum compounds are the halides. In most cases, the reaction will be effected as taught, e.g., by Klosiewicz in U.S. Pat. No. 4,400,340. A plurality of reactive liquid streams are provided. One of these streams contains the metathesis catalyst component, preferably a tungsten halide and tungsten oxyhalide complex, dissolved in the dicyclopentadiene-oligomer mixture. Another stream contains the alkyl aluminum activator compound, preferably comprising an alkyl aluminum iodide, and a reaction rate moderator to delay the catalyst activation. The activator and moderator are also dissolved in the dicyclopentadiene-oligomer mixture. These streams are mixed and immediately injected into a mold of the desired shape where reaction takes place. The reaction rate moderator delays the onset of the reaction for the time required to transfer the entire mix into the mold, following which reaction is substantially completed within about half a minute or less.

The preparation of the copolymers of this invention does not require preparation of expensive comonomers. The higher cyclopentadiene oligomers are conveniently and inexpensively prepared by heat treatment of dicyclopentadiene. By proper selection of heat treatment conditions, the desired mixture of dicyclopentadiene and oligomers can be prepared in situ and it is not necessary to effect any separation of the oligomers from dicyclopentadiene. To prepare the dicyclopentadiene-oligomer mixture, dicyclopentadiene is subjected to a temperature of about 125° to 250° C. for a period of about 0.1 to 60 hours whereby some dicyclopentadiene dissociates to cyclopentadiene. If the reaction is carried out in such a way that cyclopentadiene is prevented from escaping, the cyclopentadiene adds to the norbornene double bond of the dicyclopentadiene to form tricyclopentadiene which, in turn, can add cyclopentadiene to form tetracyclopentadiene and so on.

Within the heating temperature range of 125° to 250° C., a time/temperature relationship can be maintained such that the greater portion of the oligomer formed is tricyclopentadiene containing a small amount of tetracyclopentadiene and virtually no oligomers higher than tetracyclopentadiene. Higher temperatures and longer times lead to increased proportions of the oligomers being higher than tricyclopentadiene. Lower temperatures, say 125° C., lead to an even higher proportion of tricyclopentadiene, although at this low temperature, the heating time required would generally regarded as impractical.

In order to make the reaction proceed, it is necessary that it be carried out under conditions such that the cyclopentadiene pyrolysis products, specifically cyclopentadiene, remain within the reaction mass. This is usually accomplished by operating under reflux conditions. When operating at temperatures above about 140° C., the reaction is carried in a pressurized system.

As in most organic chemical processes, the reaction seldom goes to 100% completion so there is usually some residual cyclopentadiene remaining after the pyrolysis reaction. Moreover, unless highly purified dicyclopentadiene is used, there will also be some low boiling contaminants left from the dicyclopentadiene preparation. These are usually low molecular weight, low boiling hydrocarbon materials, a high percentage of which can be unreacted cyclopentadiene monomer. These materials, particularly the cyclopentadiene, will interfere with the metathesis reaction and detract from the physical properties of the polymerization product which results. For these reasons, the by-products must be removed.

Removal of by-products is accomplished by vacuum stripping at relatively low temperature, i.e., about 95° to 105° C. and 50 mm Hg or less. Low temperature stripping is important so that pyrolysis of the previously formed oligomers is minimized. Inert gas sparging at about the same temperature can also be employed. Following the stripping operation, the dicyclopentadiene-oligomer mixture can be contacted with an absorbent such as alumina or a zeolite as taught by Tom in U.S. Pat. No. 4,584,425.

The oligomer mixture thus prepared is predominantly, i.e., at least about 85% and often at least 90% by weight, trimer, i.e., tricyclopentadiene, with a small amount of tetramer. Oligomers higher than the tetramer are usually present, but only in negligible amounts. Although the higher oligomers enter into the polymerization reaction as does the trimer, it is preferred that the ratio of trimer to higher oligomers be as high as possible in order to assure maximum predictability of polymerization reaction parameters and product properties.

If the treatment temperature is kept relatively low, i.e., about 150° C. or less, the formation of the preferred trimer is favored. Higher temperatures lead not only to formation of greater amounts of higher oligomers, but also greater amounts of undesirable pyrolysis products which must be removed.

A fortuitous side effect of the dicyclopentadiene-oligomer mixture is that, up to about 30% by weight in dicyclopentadiene, the oligomer(s) act(s) as a melting point depressant for the dicyclopentadiene. As a result, the mixture containing as little as 5% by weight of oligomers can be a liquid at room temperature, whereas dicyclopentadiene melts at about 32° C. The melting point of a 25% oligomer mixture is about −30° C. Thus it can be seen that the mixture can be handled with a minimum of provision for maintaining the liquid state. The cost savings in equipment investment and in heating energy more than offsets the cost of carrying out the heat treatment.

It is, of course, not required that the dicyclopentadiene-oligomer mixture be prepared via the heat treatment in situ. If a source of isolated oligomers is available, the oligomers can be blended into the dicyclopentadiene at the desired ratios. The same type of melting point depression effect will be observed and the same polymerization and molding techniques can be employed. This is the preferred way of operating when a content of oligomers greater than about 30% is desired.

The significant property improvement in the products of this invention is the improved glass transition temperature and heat distortion temperature of these copolymers compared to that of dicyclopentadiene homopolymer. The Tg of the homopolymer is on the order of about 120° C. The Tg of the copolymers increases as the oligomer content of the copolymers increases. As little as 5% of the oligomer in the product can increase the Tg by 10° or 12° C. At about 23% oligomer content, a Tg of greater than 160° C. is reported. The same improvement is noted in the heat distortion temperature. A higher Tg heat distortion temperature greatly increases the scope of utility of the products.

It is believed that the increase of Tg and heat distortion temperature of these copolymers is caused by decreased mobility of the polymer claims due to the presence of the larger, more rigid oligomer molecules relative to dicyclopentadiene. For this same reason, however, the impact resistance of the polymer is significantly reduced compared to that of dicyclopentadiene homopolymer. As Tg is gained, impact resistance is correspondingly lost.

The lost impact resistance can be substantially regained in the final molded polymer product either by reinforcement or by including an elastomer in the formulation. About 3 to 15% by weight of an elastomer is already added to most dicyclopentadiene polymerizations for the purpose of increasing the viscosity of the reaction streams to facilitate nonturbulent filling of molds. The elastomer yields the additional beneficial effect of improving the impact resistance of the polymer product. Impact resistance of the rubbercontaining copolymer is sufficient for virtually all applications. Elastomers which can be employed include, e.g., butyl rubber, polyisoprene, polybutadiene, polyisobutylene, styrene-butadiene block and random copolymer rubbers, ethylene-propylene copolymers and ethylene-propylene-diene terpolymers. Styrene-butadiene-random copolymer rubber is especially effective for increasing impact resistance. The amount of elastomer used is determined by its molecular weight and is limited by the maximum viscosity tolerable in the resultant reaction streams. That viscosity must not be so high as to interfere with rapid mixing of the reactant streams. The elastomer can be added to one or all of the reactant streams, but is preferably dissolved in all streams since mixing of the streams takes place most readily when all have essentially the same viscosity.

Reinforcement of the copolymer to increase its impact resistance can also be accomplished by addition of fibrous or particulate reinforcing materials. Particulate reinforcing materials include, inter alia glass, wollastonite, mica, carbon black, talc and calcium carbonate. Reinforcing materials can be added in amounts up to about 75% by weight based on the weight of the polymer, preferably about 1 to 40%. Another preferred form of reinforcement is organic or inorganic fibrous materials and, in particular, glass. The fiber can be either chopped, as staple fiber or in a continuous mat form. When the reinforcing material is fibrous, it is sometimes preferred to use a low viscosity reaction stream which can readily flow around and in among the fibers. For this reason, elastomer is frequently not included in the reactant streams in the fiber-filled embodiment.

The invention is exemplified by the following examples.

EXAMPLE 1

Preparation of Dicyclopentadiene-Oligomer Mixture

Approximately 1.5 liter portions of polymerization grade dicyclopentadiene were charged to a nitrogen-sparged 2 liter flask equipped with magnetic stirring bar, reflux condenser and thermometer with temperature controller. The reaction mixture was kept under nitrogen with nitrogen passed over the end of the reflux condenser through a bubbler. After 4 hours at 155° C. or 6 hours at 150° C., the dicyclopentadiene was cooled, passed through an alumina column under nitrogen, and collected in nitrogen flushed capped bottles containing BHT antioxidant (ca. 300 ppm based on dicyclopentadiene). Half of each preparation was warmed to 34° to 40° C. and sparged with nitrogen for 2 hours to remove light ends.

Preparation of Catalyst and Activator

A 0.5M solution of tungsten catalyst was prepared by weighing 19.80 g (0.05 mole) of $WCL_6$ into a 200 ml reaction vessel containing a teflon-coated magnetic stirring bar under nitrogen. The tungsten was then slurried in 90 ml of toluene that had been distilled from Na/K alloy under nitrogen. t-Butanol (0.925 g, 0.0125 mole), dissolved in 5 ml of toluene, was added, and the mixture was stirred for one hour while sparging with nitrogen. Nonyl phenol (11.05 g, 0.05 mole), dissolved in 5 ml of toluene, was added, and the mixture was stirred for one hour while sparging with nitrogen. Acetylacetone (10.00 g, 0.100 mole) was then added by syringe and the mixture was stirred overnight while sparging with nitrogen to remove HCl gas. Toluene was then added to restore the volume of the solution to its original level and produce a 0.50M solution.

A 1.0M solution of complexed aluminum alkyl activator was prepared by diluting 5.70 g of di-n-octylaluminum iodide, 31.17 g of tri-n-octylaluminum, and 13.42 g of bis(methoxyethyl)ether to a volume of 100 ml with distilled toluene, under a nitrogen atmosphere.

Polymerization

A mold was made from two glass panels, 30 cm square, separated by a polyethylene spacer about 0.32 cm in diameter, which contained a stiff wire holding it in a U-shape. Masking tape was placed around three sides of the mold, and the plates were clamped gently with spring clamps to form a tight seal. The glass mold and all chemical components were placed in a nitrogen purged flexible glove bag, and the mold was flushed thoroughly with nitrogen. Within the glove bag, 150 ml of each of the heat treated dicyclopentadiene modifications was treated with 2.1 ml of the 1M aluminum alkyl activator complex and stirred.

From a plastic syringe was then added 1.52 ml of the 0.5M tungsten catalyst solution. The resulting mixture was stirred for 5 seconds and poured into the glass mold. The material gelled in 12 to 15 seconds and exothermed in about to 45 seconds as evidenced by warming of the glass plates. After cooling to room temperature, the mold was disassembled and the plaque was removed for testing. Results are recorded in Table 1.

TABLE 1

| Example No. | 1A | 1B | 1C | 1D | Untreated Control |
|---|---|---|---|---|---|
| Oligomer Preparation | | | | | |
| Heat cycle temp, °C. | 155 | 155 | 150 | 150 | |
| Heat cycle time, hr. | 4 | 4 | 6 | 6 | |
| Nitrogen sparged afterwards | no | yes | no | yes | |
| Oligomer Analyses | | | | | |
| Light ends (incl. Cp* monomer), % | 0.29 | 0.08 | 0.33 | 0.23 | 0.06 |
| DCPD, % | 88.4 | 88.9 | 88.6 | 87.8 | 98.3 |
| Cp trimers, % | 9.9 | 10.4 | 10.2 | 11.0 | 1.6 |
| Cp tetramers, % | 0.5 | 0.5 | 0.4 | 0.6 | 0.01 |
| Polymer Properties Tg, °C. | 133 | 148 | 135 | 138 | 110–115 |
| Mechanical Properties SI Units | | | | | |
| Flex modulus, GPA | 2.29 | 2.30 | 2.27 | 2.22 | |
| Flex strength, MPa | 90.9 | 90.9 | 87.5 | 88.5 | |
| Plate impact | 4.05 | 3.77 | 4.16 | 1.30 | |
| Notched izod, J/m | 215 | 199 | 211 | 69 | |

*Cp = cyclopentadiene

EXAMPLE 2

Preparation of Dicyclopentadiene-Oligomer Mixture

Polymerization grade dicyclopentadiene (99+% pure) was heated in a steel autoclave under a nitrogen atmosphere at 145° C. for 6 or 9 hours and at or 165° C. for 3 or 5 hours. The heat-treated dicyclopentadiene was then vacuum stripped at about 50 mm Hg at pot temperatures from about 98° to 108° C. Details of the run are recorded in Table 2.

Polymerization

Each of the four dicyclopentadiene-oligomer mixtures was polymerized using a standard reaction injection molding (RIM) machine (Accuratio Co., Jeffersonville, Ind.). The liquid dicyclopentadiene-oligomer mixture was blended with 6% by weight of styrene-butadiene random copolymer rubber (Stereon 720A) and charged to each of the monomer storage tanks on the RIM machine. The tanks were inerted with nitrogen. To one tank was added sufficient tri-n-octylaluminum to form a 0.0226M solution, sufficient dioctylaluminum iodide to form a 0.004M solution and sufficient dimethoxyethyl ether that the molar ratio of dimethoxyethyl ether to Al was 1:1. To the other tank was charged sufficient tungsten catalyst solution (prepared as in Example 1) to form a 0.0089M solution in the monomer. Oxygen and moisture were excluded from the system throughout.

The two reactant solutions were mixed in equal proportions using a standard impingement type RIM mixing head through orifices of 0.081 cm at a flow rate of about 80 ml/second and a pressure of about 1000 psi. The mixture was pumped directly into a 10"×10"×⅛" plaque mold heated to between 50° and 60° C. Polymerization was complete and the plaque was demolded after about 30 seconds.

Physical properties of the resultant polymer are recorded in Table 2.

TABLE 2

| | 2A | 2B | 2C | 2D |
|---|---|---|---|---|
| DCPD Treatment and Composition | | | | |
| Heating temperature, °C. | 145 | 145 | 165 | 165 |
| Heating time, hr. | 6 | 9 | 3 | 5 |
| Composition after stripping, % | | | | |
| cyclopentadiene | 0.02 | 0.06 | 0.03 | 0.06 |
| dicyclopentadiene | 93.5 | 89.7 | 83.3 | 76.4 |
| tricyclopentadiene | 6.5 | 10.2 | 16.1 | 22.2 |
| tetracyclopentadiene | — | — | 0.6 | 1.3 |
| Freezing point, °C. | 6.4 | −30 | −38 | −30 |
| Polymer Properties | | | | |
| Tg, °C. | 132 | 141 | 152 | 162 |
| Heat distortion temp., °C. | 88 | 98 | 109 | 118 |
| Mechanical Properties SI Units | | | | |
| Flex modulus, GPa | 1.94 | 2.09 | 2.04 | 2.14 |
| Flex strength, MPa | 78 | 85 | 87 | 90 |
| Tensile modulus, GPa | 1.59 | 1.61 | 1.61 | 1.63 |
| Tensile strength, MPa | 41 | 45 | 44 | 48 |
| Elongation, % | 79 | 60 | 39 | 50 |
| Plate impact, Joules | 21.0 | 19.8 | 17.4 | 13.2 |
| Notched izod, J/m | 384 | 281 | 198 | 133 |

EXAMPLE 3

A quantity of dicyclopentadiene was heated at 165° C. for 3 hours forming 16% cyclopentadiene oligomers. Residual dicyclopentadiene and low boiling pyrolysis products were stripped at approximately 100° to 110° C. and 30 mm Hg. The residue had a melting point of 38° C. and contained about 4% dicyclopentadiene, about 86.5% tricyclopentadiene, and about 9.5% tetracyclopentadiene.

Mixtures of this oligomer concentrate with dicyclopentadiene remained liquid at room temperature (25° C.) at up to 50% concentrate by volume. Samples of dicyclopentadiene containing containing 10%, 25% or 50% of the above mixture containing 86.5% tricyclopentadiene and 9.5% tetracyclopentadiene all polymerized adequately when treated by the following procedure:

Five milliliters of monomer mixture (dicyclopentadiene-crude oligomer blend) was syringed into a test tube which had been capped and sparged with nitrogen. Aluminum alkyl activator solution (0.22 ml of a 0.4M solution) was syringed into the test tube and mixed with the contents by shaking. Then 0.29 ml of a 0.1M tungsten catalyst solution was added to the test tube by syringe, after which the contents were mixed by shaking vigorously. After about one minute a sharp exothermic polymerization was observed.

EXAMPLE 4

A quantity of dicyclopentadiene was heated at 165° C. for about five hours. At that time residual dicyclopentadiene and low boiling pyrolysis products were stripped at 100° to 110° C. and 30 mm Hg. A product containing approximately 42% dicyclopentadiene and 58% of an oligomer mixture consisting of approximately 51.5% tricyclopentadiene and 6.5% tetracyclopentadiene was recovered.

The mixture as recovered was polymerized by adding catalyst and activator to the monomer in an agitated bottle in a ratio of monomer/tungsten aluminum equal to 1,000/0.67/2.0. The mix was transferred to a glass plaque mold (described in Example 1) substantially immediately and allowed to polymerize. Polymerization was complete in about thirty seconds and the plaque was removed from the mold.

A portion of the mixture was diluted with dicyclopentadiene until the oligomer content was about 43%. This was polymerized in the same way.

Physical properties of these polymers are recorded in Table 3.

TABLE 3

|  | 58% | 43% |
| --- | --- | --- |
| Flex Modulus, GPa | 2.64 | 2.54 |
| Flex strength, MPa | 110 | 103 |
| Heat distortion Temperature, °C. | 145 | 139 |

What is claimed is:

1. A crosslinked copolymer comprising about 40 to 95% by weight, based on total copolymer weight, of repeating units derived from dicyclopentadiene and about 60 to 5% by weight of repeating units derived from higher cyclopentadiene oligomers.

2. The copolymer of claim 1 wherein at least about 85% of the higher cyclopentadiene oligomers is tricyclopentadiene.

3. The copolymer of claim 1 wherein at least about 90% of the higher cyclopentadiene oligomers is tricyclopentadiene.

* * * * *